(12) United States Patent
Tagesson et al.

(10) Patent No.: US 12,528,510 B2
(45) Date of Patent: Jan. 20, 2026

(54) METHOD FOR CONTROLLING A DRIVING OPERATION OF AN AUTONOMOUSLY CONTROLLED VEHICLE

(71) Applicant: Volvo Autonomous Solutions AB, Gothenburg (SE)

(72) Inventors: Kristoffer Tagesson, Hammarö (SE); Thorsten Helfrich, Gothenburg (SE); Mats Jonasson, Partille (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 271 days.

(21) Appl. No.: 18/253,511

(22) PCT Filed: Nov. 25, 2020

(86) PCT No.: PCT/EP2020/083391
§ 371 (c)(1),
(2) Date: May 18, 2023

(87) PCT Pub. No.: WO2022/111802
PCT Pub. Date: Jun. 2, 2022

(65) Prior Publication Data
US 2024/0010238 A1  Jan. 11, 2024

(51) Int. Cl.
*B60W 60/00* (2020.01)
*B60W 40/105* (2012.01)

(52) U.S. Cl.
CPC .... *B60W 60/00184* (2020.02); *B60W 40/105* (2013.01); *B60W 2520/12* (2013.01); *B60W 2552/30* (2020.02)

(58) Field of Classification Search
None
See application file for complete search history.

(56) References Cited

U.S. PATENT DOCUMENTS 6,024,187 A * 2/2000 Takeda ............... G01C 21/28
701/31.2
9,254,822 B1  2/2016 Friend et al.
(Continued)

FOREIGN PATENT DOCUMENTS

WO     2019125268 A1    6/2019

OTHER PUBLICATIONS

International Search Report and Written Opinion in corresponding International Application No. PCT/EP2020/083402 mailed Aug. 17, 2021 (17 pages).

(Continued)

*Primary Examiner* — Amelia Vorce
(74) *Attorney, Agent, or Firm* — Jeffri A. Kaminski; Venable LLP

(57) ABSTRACT

A method controls a driving operation of an autonomously controlled vehicle. The vehicle has an angular velocity sensor for controlling the vehicle's lateral positioning along an operated road path during a loss of location situation. The method obtains a signal indicative of a characteristic of a road path for operation of the vehicle determining an uncertainty parameter value of the angular velocity sensor for an upcoming position of the road path ahead of the vehicle; and controls the vehicle to a stand-still operation at a stop position, prior to arrival at the upcoming position, along the road path for calibration of the angular velocity sensor when the uncertainty parameter value indicates an unacceptable uncertainty in lateral deviation of the vehicle at the upcoming position.

14 Claims, 3 Drawing Sheets

(56) References Cited

U.S. PATENT DOCUMENTS

| | | | |
|---|---|---|---|
| 2002/0173910 A1 | 11/2002 | McCall et al. | |
| 2003/0036847 A1* | 2/2003 | Geier | G01C 21/28 |
| | | | 701/472 |
| 2013/0160543 A1 | 6/2013 | Kontz et al. | |
| 2014/0297177 A1* | 10/2014 | den Otter | G01C 21/166 |
| | | | 701/400 |
| 2018/0080775 A1* | 3/2018 | Loomis | G01C 21/165 |
| 2018/0224851 A1 | 8/2018 | Park | |
| 2018/0229738 A1 | 8/2018 | Nilsson et al. | |
| 2019/0012913 A1* | 1/2019 | She | B60W 10/04 |
| 2019/0100205 A1* | 4/2019 | Kean | B60W 30/18009 |
| 2019/0204425 A1 | 7/2019 | Abari et al. | |
| 2019/0210612 A1 | 7/2019 | VanLandingham et al. | |
| 2019/0227571 A1* | 7/2019 | Ito | G05D 1/0282 |
| 2019/0359188 A1* | 11/2019 | Yamada | B60T 8/88 |
| 2020/0033131 A1 | 1/2020 | Reid et al. | |
| 2020/0074848 A1* | 3/2020 | Namba | G08G 1/012 |
| 2020/0086837 A1 | 3/2020 | Le Cornec | |
| 2020/0166344 A1 | 5/2020 | Knutson et al. | |
| 2020/0233420 A1 | 7/2020 | Liu et al. | |
| 2021/0026366 A1* | 1/2021 | Horesh | G01S 7/4808 |
| 2021/0215485 A1 | 7/2021 | Ishigami et al. | |
| 2021/0276577 A1* | 9/2021 | Adams | B60W 50/038 |

OTHER PUBLICATIONS

International Search Report and Written Opinion in corresponding International Application No. PCT/EP2020/083391 mailed Aug. 25, 2021 (16 pages).

Non Final Office Action dated Oct. 1, 2024 in corresponding U.S. Appl. No. 18/253,523, 16 pages.

Notice of Allowance dated Apr. 1, 2025 in corresponding U.S. Appl. No. 18/253,523, 8 pages.

* cited by examiner

METHOD FOR CONTROLLING A DRIVING OPERATION OF AN AUTONOMOUSLY CONTROLLED VEHICLE

CROSS-REFERENCE TO RELATED APPLICATIONS

This application is a U.S. National Stage application of PCT/EP2020/083391, filed Nov. 25, 2020 and published on Jun. 2, 2022 as WO 2022/111802, all of which is hereby incorporated by reference in its entirety.

TECHNICAL FIELD

The present disclosure relates to a method for controlling a driving operation of an autonomously controlled vehicle. The present disclosure also relates to a control system and an autonomously controlled vehicle comprising such a control system. Although the method will mainly be described in relation to a heavy-duty vehicle, i.e. a truck, it may also be applicable for other types of autonomously controlled vehicles, such as preferably working machines arranged in a confined area.

BACKGROUND

In the field of autonomously controlled vehicles, such as autonomously controlled heavy vehicles, i.e. trucks and working machines, there is a continuous development with regards to safety. In particular, as the vehicles are operated without substantial interference of an operator, it is important that the navigation system of such vehicle function sufficiently to be able to guide the vehicle to its end destination.

Autonomous vehicles rely on numerous types of sensors, or similar arrangements, to localize the vehicle with regards to the environment and traffic situation. According to an example prior technology, US 2002/173910 relates to a vehicle self-carried positioning system. The positioning system can obtain positioning measurements and exchange the vehicle positioning information with other vehicles.

However, the system in US 2002/173910 is still in need of further improvements. In particular, there is a desire to be able to sufficiently rely on vehicle operation in potential cases when the positioning system loses location, i.e. when the system is unable to sufficiently locate the vehicle on the road it is operating.

SUMMARY

It is an object of the present disclosure to describe a method which at least partially overcomes the above described deficiencies. This is achieved by a method according to claim 1.

According to a first aspect, there is provided a method for controlling a driving operation of an autonomously controlled vehicle, the vehicle comprising an angular velocity sensor for controlling the vehicle's lateral positioning along an operated road path during a loss of location situation, the method comprising obtaining a signal indicative of a characteristics of a road path for operation of the vehicle; determining an uncertainty parameter value of the angular velocity sensor for an upcoming position of the road path ahead of the vehicle; and controlling the vehicle to a stand-still operation at a stop position, prior to arrival at the upcoming position, along the road path for calibration of the angular velocity sensor when the uncertainty parameter value indicates an unacceptable uncertainty in lateral deviation of the vehicle at the upcoming position.

The wording "characteristics of a road path" will be described in various example embodiments below but should in general be construed as e.g. the road conditions such as the size, traffic situation, speed limit, etc. of the road the vehicle is operating. The upcoming position thus has a certain character, i.e. a width, a speed limit, a surrounding traffic environment, etc.

Moreover, the uncertainty parameter value should be construed as a determined/estimated uncertainty that the angular velocity is detecting sufficiently correct measurement values. During operation of the vehicle, the angular velocity sensor can drift. Therefore, when the angular velocity sensor has not been calibrated for a predetermined time period, it can be assumed that obtained measured angular velocity values are not fully correct, i.e. do not fully correspond to actual angular velocity values. The uncertainty of the angular velocity sensor may be acceptable based on the characteristics of the upcoming road path. In further detail, a certain uncertainty can be acceptable if the characteristics of the upcoming road path so allows. If the upcoming road path is sufficiently wide, there is low or no surrounding traffic, and/or the speed limit is low, then a higher uncertainty is allowable compared to an opposite situation.

According to a non-limiting example, the uncertainty parameter value may be allowed to be higher based on previous calibrations. In particular, if a control system of the autonomously controlled vehicle determines that the determined uncertainty was based on an angular velocity which in fact was correct, the control system may determine that a certain "uncertainty" is acceptable. The control system is thus learning during operation.

Furthermore, the "stop position" should be construed as a position along the road at which the vehicle is able to properly stop to a stand-still. The stop position could be, for example, a sufficiently large shoulder of the road, an intersection, or T-intersection, at which the vehicle should stop to give way for vehicles crossing the road, a position at a traffic light, or merely suitable stop positions along the road. The latter alternative is particular useful for vehicle operated within a confined area.

An advantage of the present disclosure is that angular velocity sensor is regularly calibrated, and it can be assured that, in a situation where the vehicle loses track of location, i.e. in a loss of location situation, the vehicle can be controlled using the angular velocity sensor as a navigation system for "blindly" operating the vehicle. By combining the uncertainty of the angular velocity sensor with the characteristics of the road path, potential bottle necks can be avoided and the risk of leaving the ego-lane, collide with obstacles, etc. when operated blindly is reduced. The loss of location should be construed such that the navigation system of the vehicle is unable to determine the current position of the vehicle. Hence, when a loss of location of the vehicle is determined, the navigation system does no longer receive position data from e.g. a GPS otherwise continuously providing information of the location of the vehicle, whereby the navigation of the vehicle is instead controlled using the angular velocity sensor. Accordingly, the present disclosure enables the vehicle to be sufficiently operated in the case of losing GPS data, as the angular velocity sensor is calibrated beforehand if the uncertainty is determined too severe. Also, in comparison to calibration at the instant point in time when losing GPS data, the present disclosure advantageously calibrates the angular velocity sensor at stop positions which are suitable for stopping the vehicle to a stand-still operation.

According to an example embodiment, the signal indicative of the characteristics of the road path may comprise information relating to a width of the road path. Hereby, if the width is narrow, a lower uncertainty parameter value is acceptable compared to a wider road path.

According to an example embodiment, the signal indicative of the characteristics of the road path may comprise information relating to speed limit of the road path. Hereby, if the speed limit is high, a lower uncertainty parameter value is acceptable compared to a lower speed limit.

According to an example embodiment, the signal indicative of the characteristics of the road path may comprise information relating to curvature characteristics of the road path. Hereby, a lower uncertainty parameter value is acceptable for a road path with a large number of curvatures, or a single curvature with a large curvature angle compared to a substantially straight ahead characteristic.

According to an example embodiment, the stop position may be a predetermined stop position received from a positioning system of the vehicle. Hereby, it can be known in advance where to stop the vehicle for calibrating the angular velocity sensor. It should however be understood that if the determined uncertainty parameter value indicates an acceptable uncertainty, the vehicle can pass a stop position without performing a calibration. In such a case, the vehicle is operated towards a second stop position where the vehicle is controlled in the stand-still operation if the uncertainty parameter value indicates an unacceptable uncertainty in lateral deviation.

According to an example embodiment, the stop position may be provided to the positioning system in the form of offline available data. The stop positions are available even after losing the navigation signal, and the vehicle can be controlled to stop at such stop position blindly.

According to an example embodiment, the predetermined stop position may be a position of the road path comprising a vehicle speed reduction characteristic. The vehicle speed reduction characteristics may, for example, be a roundabout, an intersection, etc. where the vehicle is forced to reduce its speed. As indicated above, these types of stop positions are beneficial as they do not intervene in the normal operation along the road path.

According to an example embodiment, the positioning system may be at least one of a GNSS or a LIDAR system. The GNSS can, for example, be arranged in the form of a GPS.

According to an example embodiment, the uncertainty parameter value may be compared to a predetermined parameter threshold limit for determining the unacceptable uncertainty in lateral deviation. According to an example embodiment, the predetermined threshold limit may be based on the characteristics of the road path for the upcoming position of the road path. The predetermined threshold limit may preferably be based on the current vehicle speed. For example, the uncertainty parameter value can be extrapolated from the current vehicle speed to yield a probability that the vehicle will leave the road, whereby a value of the acceptable lateral deviation can be determined.

According to an example embodiment, the uncertainty parameter value may be based on an uncertainty in the vehicle's current heading and position on the road path. Thus, a too severe uncertainty presents a risk that the vehicle is heading in the desired direction and the vehicle's position on the road is not within acceptable limits.

According to an example embodiment, the uncertainty parameter value may be based on determined ability of the vehicle to follow a desired trajectory of the road path.

According to an example embodiment, calibration of the angular velocity sensor may comprise obtaining a signal indicative of a value of the angular velocity of the angular velocity sensor when the vehicle is arranged in the stand-still operation; setting the value as an offset angular velocity; and calibrating the angular velocity sensor by subtracting the offset angular velocity from the obtained angular velocity value.

When the vehicle is arranged in the stand-still operation, it can be assumed that the angular velocity should be zero. Thus, a signal indicating an angular velocity when the vehicle is standing still is determined as an offset angular velocity.

According to an example embodiment, the angular velocity sensor may be a yaw rate sensor configured to measure a yaw angular velocity during vehicle operation.

As an alternative, and according to an example embodiment, the angular velocity sensor may be a wheel speed sensor configured to measure a wheel angular velocity during vehicle operation.

Hereby, the yaw angular velocity or wheel angular velocity is used by the navigation system of the vehicle, to autonomously operate the vehicle when losing location. The navigation system may hereby be operated to the navigate the vehicle blindly, as part of a so-called dead reckoning algorithm.

According to a second aspect, there is provided a control system configured to control a driving operation of an autonomously controlled vehicle, the control system is connectable to a navigation system and to an angular velocity sensor configured to control the vehicle's lateral positioning along an operated road path during a loss of location situation, wherein the control system is configured to obtain a signal indicative of a characteristics of a road path for operation of the vehicle; receive a signal from the angular velocity sensor, the signal being indicative of an angular velocity the angular velocity sensor; determine an uncertainty parameter value of the angular velocity signal for an upcoming position of the road path ahead of the vehicle; and when the uncertainty parameter value indicates an unacceptable uncertainty in lateral deviation of the vehicle at the upcoming position: transmit a navigation signal to the navigation system, the navigation signal being arranged to, when executed by the navigation system, cause the navigation system to autonomously operate the vehicle towards a stop position, located prior to the upcoming position, and to arrange the vehicle in a stand-still operation when the vehicle arrives at the stop position; and transmit a calibration signal to the sensor, the calibration signal being arranged to, when executed by the sensor, calibrate the sensor when the vehicle is arranged in the stand-still operation.

Effects and features of the second aspect are largely analogous to those described above in relation to the first aspect.

According to a third aspect, there is provided an autonomously controlled vehicle, comprising a navigation system, an angular velocity sensor arranged to measure an angular velocity of the vehicle in at least one direction during operation, and a control system according to the above described second aspect, wherein the control system is connected to the navigation system and to the sensor for communication of control signals therebetween.

According to a fourth aspect, there is provided a computer program comprising program code means for performing the steps of any one of the embodiments described above in relation to the first aspect when the program is run on a computer.

According to a fifth aspect, there is provided a computer readable medium carrying a computer program comprising program means for performing the steps of any one of the embodiments described above in relation to the first aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
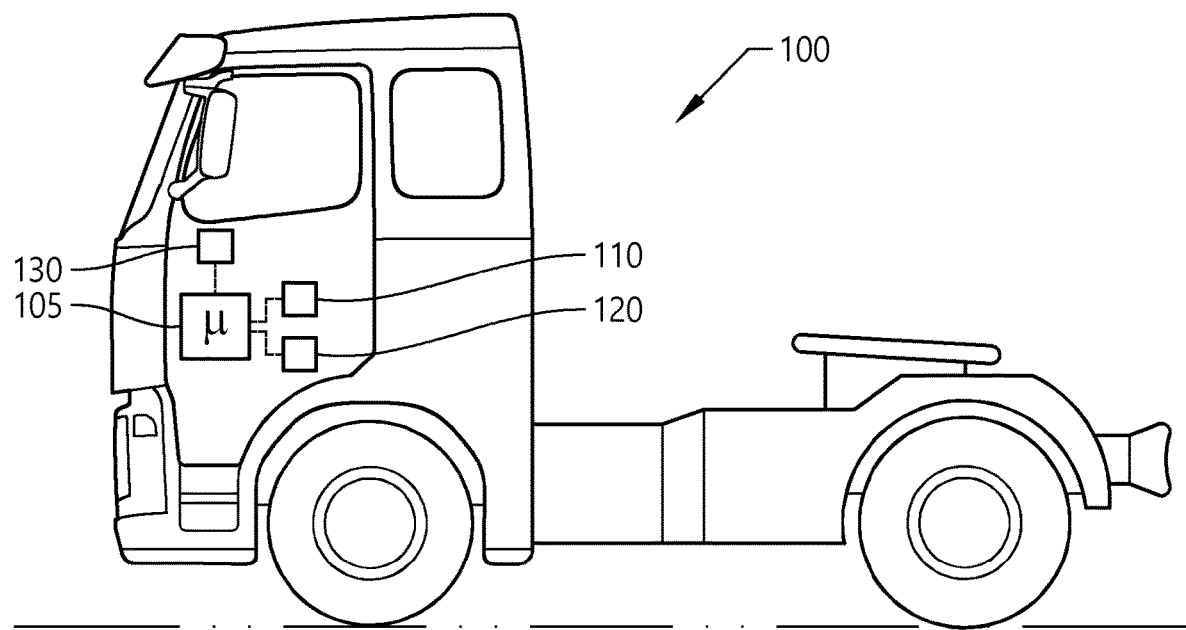
FIG. 1 is a lateral side view illustrating a vehicle suitably comprising a control system according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 in the form of a truck. The vehicle 100 comprises a control system 105, a navigation system 110 and a positioning system 130, as well as an angular velocity sensor 120 arranged to measure an angular velocity of the vehicle. It should be readily understood that the control system 105, the navigation system 110, the positioning system 130 and the angular velocity sensor 120 are merely schematically illustrated in FIG. 1. In particular, the angular velocity sensor 120 for measuring the angular velocity may be positioned, for example, in the vicinity of the wheels of the vehicle, or other suitable position for fulfilling its purpose of, as correct as possible, measure and determine a current angular velocity of the vehicle. The sensor may be at least one of a yaw rate sensor configured to measure a yaw angular velocity during vehicle operation, or a wheel speed sensor configured to measure a wheel angular velocity during vehicle operation.

The control system 105 may include a microprocessor, microcontroller, programmable digital signal processor or another programmable device. The control system 105 may also, or instead, include an application specific integrated circuit, a programmable gate array or programmable array logic, a programmable logic device, or a digital signal processor. Where the control system 105 includes a programmable device such as the microprocessor, microcontroller or programmable digital signal processor mentioned above, the processor may further include computer executable code that controls operation of the programmable device.

The positioning system 130 is arranged to receive signals indicative of the vehicle's position along a road path by receiving map data from a satellite 400. The positioning system 130 may, for example, be a, a Global Navigation Satellite System (GNSS), such as Global Positioning System (GPS), or a LI DAR system. The following will refer the positioning system 130 in relation to a GPS.

The vehicle depicted in FIG. 1 is an autonomously controlled vehicle. However, autonomously controlled should be understood such that the vehicle is configured to also be controllable by an operator driving the vehicle, or remotely controlled from e.g. a centralized control tower, etc. An operator may thus, if needed, intervene and take control of steering and propulsion of the vehicle.

Figure 2:
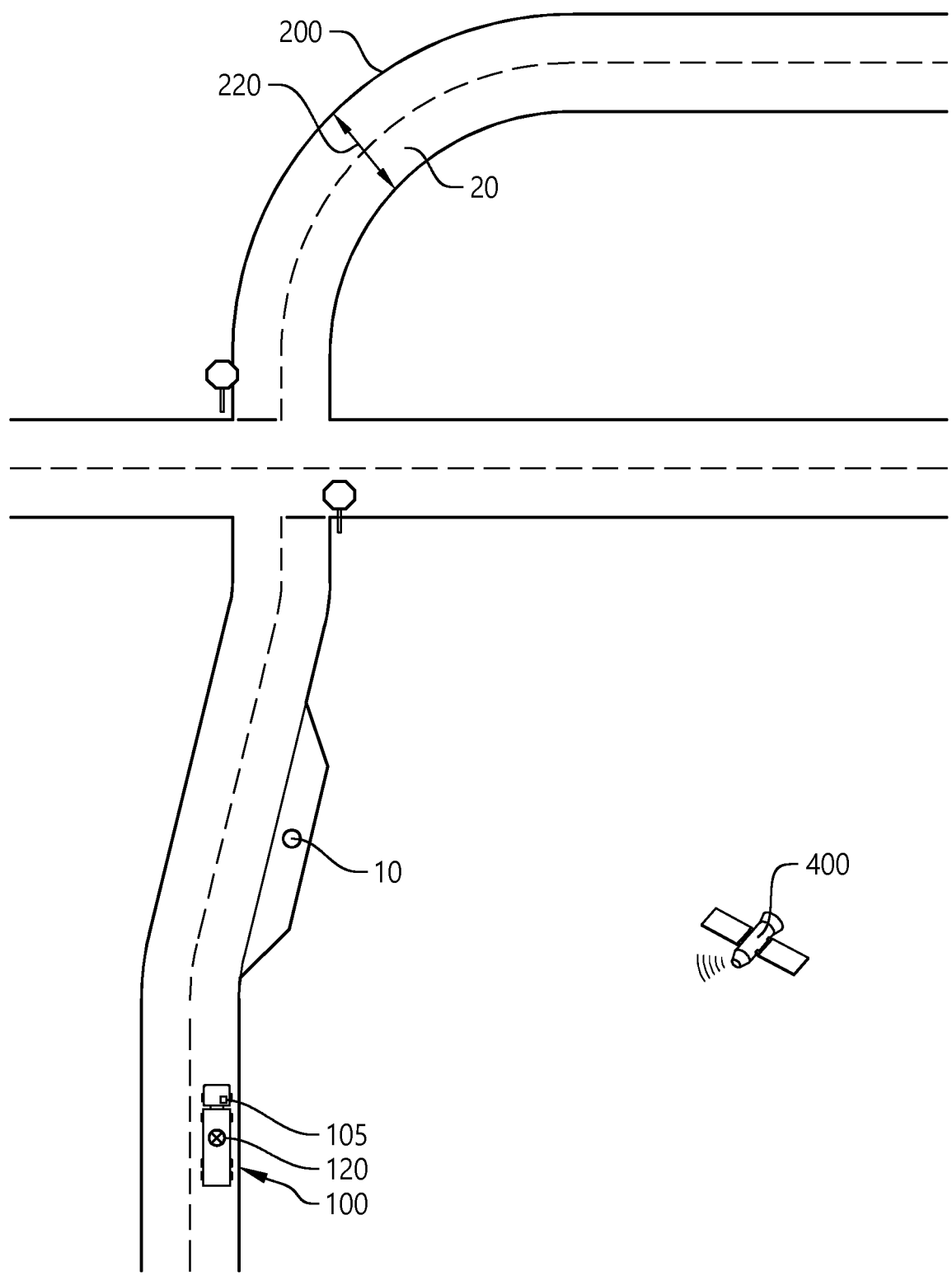
FIG. 2 is a schematic illustration of a vehicle during operation according to an example embodiment.

In order to further describe operation of the vehicle 100, reference is made to FIG. 2, which is a schematic illustration of a vehicle during operation according to an example embodiment. As can be seen, the vehicle is operated and driven along a road path 200. The road path 200 could form part of a confined area, or form part of a public road.

The vehicle 100 is operated by means of receiving map data from the satellite 400, i.e. the GPS 130 continuously receives data indicative of the road path 200 and the current position of the vehicle on the road. The map data is transmitted to the control system 105 whereby the vehicle is able to be autonomously controlled towards an end destination.

During operation, the control system 105 obtains a signal indicative of the characteristics of the road path 200 at which the vehicle is presently operated, as well as an upcoming position 20 of the road path, at which the vehicle will arrive at a future point in time. With particular reference to the upcoming position 20 of the road path, the characteristics of this position 20 is the width 220 of the road path. The characteristics can also relate to the speed limit at the specific position 20 of the road path, the curvature, the surrounding traffic situation, etc.

The control system 105 is further configured to determine an uncertainty parameter value for the angular velocity sensor 120 when the vehicle arrives at the upcoming position 20. The uncertainty parameter is thus an indication of the reliability of data received from the angular velocity sensor 120, i.e. whether the angular velocity sensor 120 has drifted too severely or if received data can be considered to correctly describe the actual lateral positioning of the vehicle 100 along the operated road at the upcoming position 20 of the road path. As a non-limiting example, the uncertainty parameter value can be based on the time period since the angular velocity sensor 120 was previously calibrated. In such a case, a longer time period since the previously performed calibration represents a higher uncertainty compared to a more recent calibration. The uncertainty may thus be considered unacceptable if a too excessive time period has lapsed since the angular velocity sensor 120 was calibrated. The uncertainty parameter value can also be based on the vehicle's ability to follow a desired trajectory of the road path. Hence, if it is determined that the vehicle will be unable to properly follow the trajectory, the received signal(s) from the angular velocity sensor 120 can be determined to not properly defining the vehicle's lateral positioning along the road. The uncertainty parameter value can also be based on the vehicle's current heading and position on the road path.

In a case where the control system 105 would lose track of location, such as if the GPS fails to receive the navigation signal from the satellite 400, the vehicle is operated using the angular velocity sensor 120. In such a case, the angular velocity sensor 120 transmits the vehicle's lateral position along the road to the navigation system, or to the autonomously controlled system of the vehicle, for blindly navigating the vehicle along the road path. Preferably, the navigation system 110 is configured to operate the vehicle in a so-called limp-home mode when operated using the angular velocity sensor 120, i.e. driving relatively slow, reduction of operational capacity of driveline components, etc. As an option, controlling the navigation system 110 using the angular velocity sensor 120 may be performed by means of a so-called path follower. When the angular velocity sensor is a yaw rate sensor, the path/speed profile in space can be translated to an equivalent yaw rate over distance/time, whereby the yaw rate from the road path is used for controlling the yaw rate of the angular velocity sensor. When the angular velocity sensor 120 is a wheel speed sensor, the navigation can be controlled in such a way that the wheel speeds of the left- and right wheels are merged to obtain the yaw rate of the road path.

It is thus important that the signal indicative of the lateral position received from the angular velocity sensor 120 is reliable for ensuring that the vehicle 100 will be properly controlled in case of loss of location.

The control system 105 thus determines the uncertainty parameter value of the angular velocity sensor 120 at the upcoming position. If the upcoming position 20 comprises a wide ego-lane, a low speed limit, and/or no substantial curvatures, some uncertainty of the angular velocity sensor 120 can be allowable. However, if the uncertainty parameter value indicates an unacceptable uncertainty in lateral deviation, the angular velocity sensor 120 is in need of calibration such that the vehicle can be properly controlled in case of losing location from the satellite 400. The vehicle 100 is therefore controlled in a stand-still operation at a stop position 10 along the road path 200. At the stop position 10, the angular velocity sensor 120 is calibrated. After the angular velocity sensor 120 is calibrated, it is considered to transmit reliable indication of the vehicle's lateral position in a potential case that the navigation system will lose track of vehicle location. Hence, controlling the vehicle 100 to a stand-still operation for calibration of the angular velocity sensor 120 is performed in a preventive purpose.

The stop position 10 along the road path is preferably a position where the vehicle anyway is forced to reduce its speed, such as a roundabout, an intersection, a T-intersection, a shoulder of the road, etc., and can be received by the control system from the GPS.

The calibration may be executed by obtaining an offset angular velocity of the sensor, which corresponds to an obtained angular velocity of the angular velocity sensor 120 when the vehicle is arranged in the stand-still operation. When calibrating the angular velocity sensor 120, the offset angular velocity is subtracted from an obtained angular velocity.

Accordingly, when the vehicle departs from the stop position 10, it is assured that the sensor is sufficiently calibrated for potentially being used at the upcoming position 20 of the road path.

Figure 3:
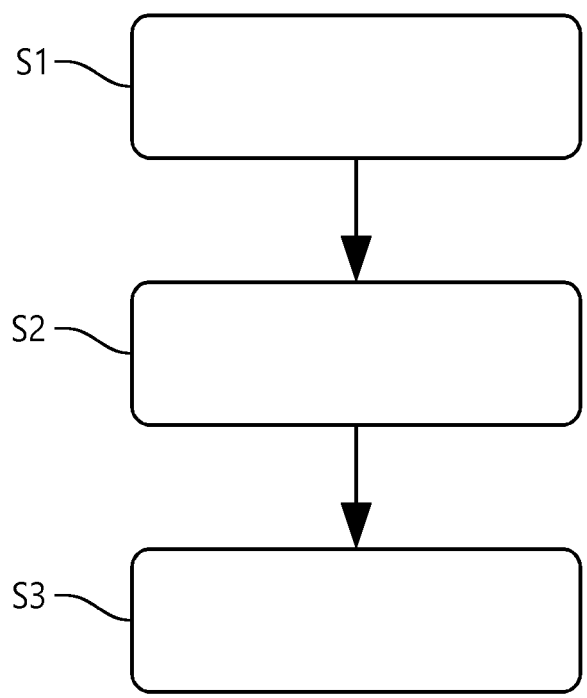
FIG. 3 is a flow chart of a method for controlling a driving operation of an autonomously controlled vehicle according to an example embodiment.

In order to sum up, reference is made to FIG. 3 which is a flow chart of a method for controlling the driving operation of the autonomously controlled vehicle depicted in FIG. 1. During operation, the control system 105 obtains S1 a signal indicative of the characteristics of the road path 200. The control system determines S2 an uncertainty parameter value of the angular velocity sensor 120 for an upcoming position 20 of the road path 200. The control system 105 thus receives a signal indicative of the angular velocity of the angular velocity sensor 120.

If the uncertainty parameter value indicates an unacceptable uncertainty in lateral deviation of the vehicle at the upcoming position, the vehicle is controlled S3 to a stand-still operation at the stop position 10 for calibration of the angular velocity sensor 120.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling a driving operation of an autonomously controlled vehicle, the vehicle comprising an angular velocity sensor for controlling the vehicle's lateral positioning along an operated road path during a loss of location situation, the method comprising:
   obtaining a signal indicative of characteristics of a road path for operation of the vehicle;
   determining an uncertainty parameter value of the angular velocity sensor for an upcoming position of the road path ahead of the vehicle, the uncertainty parameter value being compared to a predetermined parameter threshold limit for determining an unacceptable uncertainty in lateral deviation; and
   controlling the vehicle to a stand-still operation at a predetermined stop position received from a positioning system of the vehicle, prior to arrival at the upcoming position, along the road path for calibration of the angular velocity sensor when the uncertainty parameter value is indicated as an unacceptable uncertainty in lateral deviation of the vehicle at the upcoming position, wherein the predetermined stop position is a position of the road path comprising a vehicle speed reduction characteristic.

2. The method according to claim 1, wherein the signal indicative of the characteristics of the road path comprises information relating to a width of the road path.

3. The method according to claim 1, wherein the signal indicative of the characteristics of the road path comprises information relating to speed limit of the road path.

4. The method according to claim 1, wherein the signal indicative of the characteristics of the road path comprises information relating to curvature characteristics of the road path.

5. The method according to claim 1, wherein the stop position is provided to the positioning system in the form of offline available data.

6. The method according to claim 1, wherein the predetermined threshold limit is based on the characteristics of the road path for the upcoming position of the road path.

7. The method according to claim 1, wherein the uncertainty parameter value is based on an uncertainty in the vehicle's current heading and position on the road path.

8. The method according to claim 1, wherein the uncertainty parameter value is based on determined ability of the vehicle to follow a desired trajectory of the road path.

9. The method according to claim 1, wherein calibration of the angular velocity sensor comprises:

obtaining a signal indicative of a value of the angular velocity of the angular velocity sensor when the vehicle is arranged in the stand-still operation;

setting the value as an offset angular velocity; and calibrating the angular velocity sensor by subtracting the offset angular velocity from the obtained value of the angular velocity.

10. The method according to claim 1, wherein the angular velocity sensor is a yaw rate sensor configured to measure a yaw angular velocity during vehicle operation.

11. The method according to claim 1, wherein the angular velocity sensor is a wheel speed sensor configured to measure a wheel angular velocity during vehicle operation.

12. A control system configured to control a driving operation of an autonomously controlled vehicle, the control system is connectable to a navigation system and to an angular velocity sensor configured to control the vehicle's lateral positioning along an operated road path during a loss of location situation, wherein the control system is configured to:

obtain a signal indicative of characteristics of a road path for operation of the vehicle;

receive a signal from the angular velocity sensor, the signal being indicative of an angular velocity the angular velocity sensor;

determine an uncertainty parameter value of the angular velocity signal for an upcoming position of the road path ahead of the vehicle, the uncertainty parameter value being compared to a predetermined parameter threshold limit for determining an unacceptable uncertainty in lateral deviation; and when the uncertainty parameter value is indicated as an unacceptable uncertainty in lateral deviation of the vehicle at the upcoming position, to:

transmit a navigation signal to the navigation system, the navigation signal being arranged to, when executed by the navigation system, cause the navigation system to autonomously operate the vehicle towards a predetermined stop position received from a positioning system of the vehicle, located prior to the upcoming position, and to arrange the vehicle in a stand-still operation when the vehicle arrives at the stop position, the predetermined stop position being a position of the road path comprising a vehicle speed reduction characteristic; and transmit a calibration signal to the sensor, the calibration signal being arranged to, when executed by the sensor, calibrate the sensor when the vehicle is arranged in the stand-still operation.

13. An autonomously controlled vehicle, comprising a navigation system, an angular velocity sensor arranged to measure an angular velocity of the vehicle in at least one direction during operation, and a control system according to claim 12, wherein the control system is connected to the navigation system and to the sensor for communication of control signals therebetween.

14. A non-transitory computer readable medium carrying a computer program code for performing the method of claim 1 when the program code is run on a computer.

* * * * *